United States Patent
Zhao et al.

(10) Patent No.: US 12,511,811 B1
(45) Date of Patent: Dec. 30, 2025

(54) METHOD AND SYSTEM FOR CALIBRATING ERGONOMIC DIGITAL HUMAN BASED ON DIGITAL STANDARD HUMAN

(71) Applicant: China National Institute of Standardization, Beijing (CN)

(72) Inventors: Jing Zhao, Beijing (CN); Wenxing Ding, Beijing (CN); Xuan Zhang, Beijing (CN); Fan Zhang, Beijing (CN); Gang Wu, Beijing (CN)

(73) Assignee: China National Institute of Standardization, Beijing (CN)

( * ) Notice: Subject to any disclaimer, the term of this patent is extended or adjusted under 35 U.S.C. 154(b) by 0 days.

(21) Appl. No.: 19/195,630

(22) Filed: Apr. 30, 2025

(30) Foreign Application Priority Data

Jul. 1, 2024 (CN) .......................... 202410870055.1

(51) Int. Cl.
*G06T 13/40* (2011.01)
*G06V 40/16* (2022.01)
(Continued)

(52) U.S. Cl.
CPC ............ *G06T 13/40* (2013.01); *G06V 40/171* (2022.01); *G06V 40/174* (2022.01); *G06V 40/20* (2022.01); *G10L 25/51* (2013.01)

(58) Field of Classification Search
None
See application file for complete search history.

(56) References Cited

U.S. PATENT DOCUMENTS 10,504,268 B1 * 12/2019 Huang ................. G06V 10/772
2011/0304632 A1 * 12/2011 Everett ..................... G06F 3/011
715/764

(Continued)

FOREIGN PATENT DOCUMENTS

CN 111273783 B 1/2023
CN 110108159 B 5/2024

OTHER PUBLICATIONS

Fu et al., "Real-Time Multimodal Human-Avatar Interaction" (Year: 2008).*

(Continued)

*Primary Examiner* — Hilina K Demeter

(57) ABSTRACT

Disclosed are a method and system for calibrating an ergonomic digital human based on a digital standard human. By collecting and analyzing appearance data and action data of an ergonomic digital human, the present disclosure makes the ergonomic digital human more life-like in appearance and action. By collecting and analyzing expression data and voice data, the present disclosure enables the digital human to have more authentic expression and voice and express various emotional states more accurately, thereby enhancing emotional communication and interaction with the user. By collecting and analyzing interaction data, the present disclosure improves interaction accuracy and response speed of the ergonomic digital human. By optimizing ergonomic calibration of the ergonomic digital human, the present disclosure improves action accuracy when the ergonomic digital human executes an interaction task and reduces an error rate of interaction, such that a better user experience is available in different interaction scenarios.

6 Claims, 2 Drawing Sheets

(51) Int. Cl.
    *G06V 40/20*    (2022.01)
    *G10L 25/51*    (2013.01)

(56) References Cited

U.S. PATENT DOCUMENTS

2017/0301125 A1* 10/2017 Bouaziz .............. G06V 40/176
2019/0155386 A1* 5/2019 Tadi ........................ G06F 3/017

OTHER PUBLICATIONS

Wu et al., "Using a Fully Expressive Avatar to Collaborate in Virtual Reality: Evaluation of Task Performance, Presence and Attraction" (Year: 2021).*

Zhang et al., "Real-time Adaptive Behaviors in Multimodal Human-Avatar Interactions" (Year: 2010).*

Blanz et al., "A Morphable Model for the Synthesis of 3D faces" (Year: 1999).*

* cited by examiner

METHOD AND SYSTEM FOR CALIBRATING ERGONOMIC DIGITAL HUMAN BASED ON DIGITAL STANDARD HUMAN

CROSS-REFERENCE TO RELATED APPLICATION

This application claims priority of Chinese Patent Application No. 202410870055.1, filed on Jul. 1, 2024, the entire contents of which are incorporated herein by reference.

TECHNICAL FIELD

The present disclosure relates to the technical field of digital human calibration data processing, and specifically relates to a method and system for calibrating an ergonomic digital human based on a digital standard human.

BACKGROUND

At present, despite the continuous advancement of digital human technology, unified standards or specifications for controlling and interacting with digital humans have not been established yet. Digital human control and interaction solutions of the prior art focus only on specific aspects of digital humans, and performance and quality of digital humans cannot be evaluated objectively and comprehensively. During simulation of a digital human, discrepancies may exist between simulated behaviors and characteristics and real human behaviors and characteristics, such that performance of the digital human in a real environment cannot be accurately reflected. Moreover, improper data acquisition and processing methods for digital humans may compromise accuracy and reliability of simulation results.

For example, the invention patent with the publication No. CN111273783B provides a digital human control method and device, and relates to the technical field of artificial intelligence. The method specifically includes: controlling a digital human to execute a first task; upon receiving a first instruction, obtaining a first action currently performed by the digital human in the first task, and a second action indicated by the first instruction; in the case where there are no conflicting skeletal points between the first action and the second action, fusing the first action and the second action to obtain a fused action according to positions of all the skeletal points when the digital human performs the first action, positions of all the skeletal points when the digital human performs the second action, and a movement law of human body; and controlling the digital human to perform the fused action, such that the digital human is human-like in action, does the actions in a more natural and smooth manner, and is humanized to a greater extent.

For example, the invention patent with the publication No. CN110108159B discloses a system and method for analog simulation of large-space multi-user interactions. The system includes an individual device and an aggregated device, where the individual device is a device worn by the user, and the individual device includes: a simulated firearm device, a full-body motion capture device, a virtual reality helmet, and a first wireless data communication terminal. The first wireless data communication terminal is configured to collect usage data of the simulated firearm device, the full-body motion capture device, and the virtual reality helmet respectively, and send the usage data to the aggregated device. The aggregated device is configured to provide feedback on the usage data, and send feedback data to the first wireless data communication terminal, such that the first wireless data communication terminal distributes the data to the simulated firearm device, the full-body motion capture device, and the virtual reality helmet, and an immersive virtual experience is available through the individual device and the aggregated device.

Combined with the above technical solutions, it is found that any slight change in the skeletal joint position or action when the digital human performs an action according to a control instruction, maybe disrupt naturalness and smoothness of the fused action. In actual applications, an interaction of the digital human is susceptible to various environmental factors, which affects the interaction and stability of the digital human. Additionally, there exist certain differences for different digital human technology platforms and digital human data processing processes, thereby posing difficulties and challenges to effective integration of different digital human technology platforms and digital human data processing processes.

SUMMARY

In order to overcome the defects of the prior art, the present disclosure provides a method and system for calibrating an ergonomic digital human based on a digital standard human, to effectively solve the technical problems mentioned in the above Background.

In order to achieve the above objective, the present disclosure is achieved by the following technical solution: in a first aspect, the present disclosure provides a method for calibrating an ergonomic digital human based on a digital standard human. The method includes:

S1, ergonomic digital human data acquisition: acquiring appearance data, action data, expression data, voice data and interaction data of an ergonomic digital human with a digital human simulation system;

S2, ergonomic digital human data analysis: analyzing the appearance data and the action data of the ergonomic digital human to obtain a morphological calibration indicator of the ergonomic digital human, analyzing the expression data and the voice data of the ergonomic digital human to obtain a functional calibration indicator of the ergonomic digital human, and analyzing the interaction data of the ergonomic digital human to obtain an interaction calibration indicator of the ergonomic digital human;

S3, ergonomic digital human calibration evaluation: comprehensively analyzing the morphological calibration indicator, the functional calibration indicator and the interaction calibration indicator of the ergonomic digital human to obtain a calibration evaluation indicator of the ergonomic digital human with a digital human simulation system; and S4, ergonomic digital human calibration evaluation and optimization: comparing the calibration evaluation indicator of the ergonomic digital human with a digital human simulation system with a preset reference indicator of digital standard human calibration, and finally optimizing ergonomic calibration of the ergonomic digital human with the digital human simulation system.

As a further optimization of the method, the appearance data and the action data of the ergonomic digital human specifically include:

The appearance data of the ergonomic digital human includes a pupil diameter, maximum visual angle and distance from an inner canthus of a left eye to an inner canthus of a right eye of eyes of the ergonomic digital human, a length, width, nasal bridge height and nostril diameter of nose, a width, length and lip thickness of mouth, an auricle length, width, thickness and earhole diameter of ears, a contour area of face, and a height, weight, upper limb length, lower limb length and body surface area of the ergonomic digital human.

The action data of the ergonomic digital human includes an average speed of the ergonomic digital human during a motion cycle, and a bending angle of each joint.

As a further optimization of the method, the morphological calibration indicator of the ergonomic digital human is specifically analyzed as follows:

A facial component feature index of the ergonomic digital human, a body surface feature index of the ergonomic digital human, and a motion state index of the ergonomic digital human are comprehensively analyzed to obtain the morphological calibration indicator of the ergonomic digital human.

As a further optimization of the method, the expression data and the voice data of the ergonomic digital human specifically include:

The expression data of the ergonomic digital human includes a curvature of mouth corner corresponding to each expression of the ergonomic digital human, and a distance between a center point of an upper eyelid and a center point of a lower eyelid of the ergonomic digital human.

The curvature of mouth corner corresponding to each expression of the ergonomic digital human is subtracted by a preset initial curvature of mouth corner of the digital standard human to obtain a curvature of mouth corner change in the ergonomic digital human, and is multiplied by an influence factor corresponding to a unit value of a curvature of mouth corner change preset in a digital standard human database to obtain a mouth corner change index of the ergonomic digital human.

The distance between a center point of an upper eyelid and a center point of a lower eyelid of the ergonomic digital human is subtracted by an initial distance between a center point of an upper eyelid and a center point of a lower eyelid of the digital standard human preset in the digital standard human database to obtain an eye opening/closing degree of the ergonomic digital person, and is multiplied by an influence factor corresponding to a unit value of an eye opening/closing degree preset in the digital standard human database to obtain an eye opening/closing index of the ergonomic digital person.

The mouth corner change index of the ergonomic digital human and the eye opening/closing index of the ergonomic digital person are summed to obtain an expression change index of the ergonomic digital human.

The voice data of the ergonomic digital human includes an average decibel of the ergonomic digital human's voice and an average speech rate of the ergonomic digital human.

As a further optimization of the method, the functional calibration indicator of the ergonomic digital human is specifically analyzed as follows:

The expression change index of the ergonomic digital human, the average decibel of the ergonomic digital human's voice and the average speech rate of the ergonomic digital human are comprehensively processed to obtain the functional calibration indicator of the ergonomic digital human.

As a further optimization of the method, the interaction calibration indicator of the ergonomic digital human is specifically analyzed as follows:

The interaction data of the ergonomic digital human includes a total number of interactions, an information input termination time point corresponding to each interaction, an interaction response start time point corresponding to each interaction, and an interaction response end time point corresponding to each interaction.

The interaction response start time point corresponding to each interaction of the ergonomic digital human is subtracted by the information input termination time point corresponding to each interaction to obtain a response waiting duration of each interaction of the ergonomic digital human.

The interaction response end time point corresponding to each interaction of the ergonomic digital human is subtracted by the interaction response start time point corresponding to each interaction to obtain a response duration of each interaction of the ergonomic digital human.

The total number of interactions of the ergonomic digital human, the response waiting duration of each interaction of the ergonomic digital human, and the response duration of each interaction of the ergonomic digital human are comprehensively analyzed to obtain the interaction calibration indicator of the ergonomic digital human.

As a further optimization of the method, the calibration evaluation indicator of the ergonomic digital human with a digital human simulation system is specifically analyzed as follows:

The morphological calibration indicator, the functional calibration indicator and the interaction calibration indicator of the ergonomic digital human are comprehensively analyzed to finally obtain the calibration evaluation indicator of the ergonomic digital human with a digital human simulation system, with a specific analysis formula as follows:

$$\delta = e^{\frac{(\varphi_1 * f_1 + \eta * f_2 + \tau * f_3)}{f_1 * f_2 * f_3}};$$

where $\delta$ is a calibration evaluation indicator of the ergonomic digital human with a digital human simulation system, e is a natural constant, $\varphi_1$ is a morphological calibration indicator of the ergonomic digital human, $\eta$ is a functional calibration indicator of the ergonomic digital human, $\tau$ is an interaction calibration indicator of the ergonomic digital human, $f_1$ is a weight factor of the morphological calibration indicator of the ergonomic digital human preset in the digital standard human database, $f_2$ is a weight factor of the functional calibration indicator of the ergonomic digital human preset in the digital standard human database, and $f_3$ is a weight factor of the interaction calibration indicator of the ergonomic digital human preset in the digital standard human database.

As a further optimization of the method, the ergonomic calibration of the ergonomic digital human with the digital human simulation system is specifically optimized as follows:

The calibration evaluation indicator of the ergonomic digital human with a digital human simulation system is compared with the preset reference indicator of digital standard human calibration to obtain a calibration accuracy value of the ergonomic digital human, and then matched with a calibration optimization strategy corresponding to each calibration accuracy value interval of the ergonomic digital human to obtain a calibration optimization strategy of the ergonomic digital human, so as to optimize the ergonomic calibration of the ergonomic digital human with the digital human simulation system.

In a second aspect, the present disclosure provides a system for calibrating an ergonomic digital human based on a digital standard human. The system includes:

a module for ergonomic digital human data acquisition, configured for acquiring appearance data, action data, expression data, voice data and interaction data of an ergonomic digital human with a digital human simulation system;

a module for ergonomic digital human data analysis, configured for analyzing the appearance data and the action data of the ergonomic digital human to obtain a morphological calibration indicator of the ergonomic digital human, analyzing the expression data and the voice data of the ergonomic digital human to obtain a functional calibration indicator of the ergonomic digital human, and analyzing the interaction data of the ergonomic digital human to obtain an interaction calibration indicator of the ergonomic digital human;

a module for ergonomic digital human calibration evaluation, configured for comprehensively analyzing the morphological calibration indicator, the functional calibration indicator and the interaction calibration indicator of the ergonomic digital human to obtain a calibration evaluation indicator of the ergonomic digital human with a digital human simulation system; and a module for ergonomic digital human calibration evaluation and optimization, configured for comparing the calibration evaluation indicator of the ergonomic digital human with a digital human simulation system with a preset reference indicator of digital standard human calibration, and finally optimizing ergonomic calibration of the ergonomic digital human with the digital human simulation system.

Compared with the prior art, the examples of the present disclosure have at least the following advantages or beneficial effects:

(1) By analyzing the appearance data and the action data of the ergonomic digital human and calibrating same against the digital standard human, the present disclosure realizes more realistic visualization of the ergonomic digital human and enhances the user's sense of immersion and experience. Calibration of the appearance data and the action data facilitates adjustment of postures and actions of the ergonomic digital human to better align with actual human body characteristics and movement law, which helps to improve the accuracy and naturalness of the digital human's postures and actions.

(2) The present disclosure captures emotion and mood expressions of the ergonomic digital human by analyzing the expression data and the voice data of the ergonomic digital human. Calibration of these data enables the digital human to express various emotional states more accurately, and calibration of the expression data and the voice data enables more authentic expression and voice of the digital human. The authentic expression and voice enhance the user's emotional resonance, emotional communication and interaction with the ergonomic digital human.

(3) By analyzing the interaction data of the ergonomic digital human, the present disclosure enables the ergonomic digital human to more accurately identify and understand the user's interactions and intentions, such that interaction accuracy and response speed of the ergonomic digital human are improved. Calibration of the interaction data makes the interactions and responses of the digital human more natural, smooth and targeted, thereby enhancing the user experience and satisfaction.

(4) By optimizing the ergonomic calibration of the ergonomic digital human, the present disclosure improves action accuracy when the ergonomic digital human executes an interaction task and reduces an error rate of interaction, such that the digital human can offer a more fascinating user experience in different interaction scenarios, and the digital human can better understand and respond to the user's needs and behaviors, thereby making the interactions more humanized and personalized.

BRIEF DESCRIPTION OF THE DRAWINGS

The present disclosure will be further described below with reference to the accompanying drawings, but the examples in the accompanying drawings do not constitute any limitation to the present disclosure. Those of ordinary skill in the art can also derive other accompanying drawings from the following accompanying drawings without making inventive efforts.

DETAILED DESCRIPTIONS OF THE EMBODIMENTS

The technical solutions of the embodiments of the present disclosure will be described below clearly and comprehensively in conjunction with accompanying drawings of the examples of the present disclosure. Apparently, the examples described are merely some examples rather than all examples of the present disclosure. Based on the examples of the present disclosure, all other examples obtained by the ordinary skill in the art without creative work fall within the scope of protection of the present disclosure.

Figure 1:
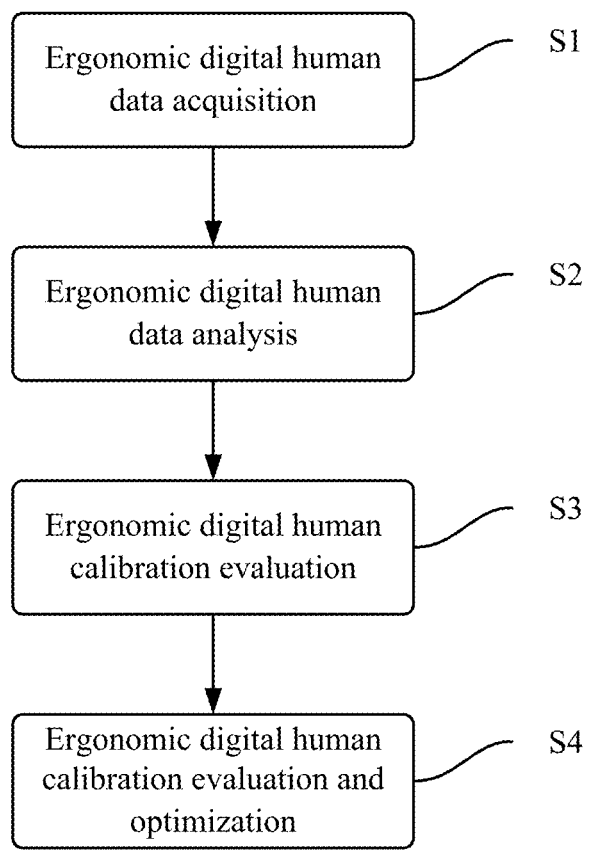
FIG. 1 is a flowchart illustrating steps of a method of the present disclosure.

With reference to FIG. 1, in a first aspect, the present disclosure provides a method for calibrating an ergonomic digital human based on a digital standard human. The method includes:

S1, ergonomic digital human data acquisition: acquire appearance data, action data, expression data, voice data and interaction data of an ergonomic digital human with a digital human simulation system;

S2, ergonomic digital human data analysis: analyze the appearance data and the action data of the ergonomic digital human to obtain a morphological calibration indicator of the ergonomic digital human, analyze the expression data and the voice data of the ergonomic digital human to obtain a functional calibration indicator of the ergonomic digital human, and analyze the interaction data of the ergonomic digital human to obtain an interaction calibration indicator of the ergonomic digital human;

S3, ergonomic digital human calibration evaluation: comprehensively analyze the morphological calibration indicator, the functional calibration indicator and the interaction calibration indicator of the ergonomic digital human to obtain a calibration evaluation indicator of the ergonomic digital human with a digital human simulation system; and S4, ergonomic digital human calibration evaluation and optimization: compare the calibration evaluation indicator of the ergonomic digital human with a digital human simulation system with a preset reference indicator of digital standard human calibration, and finally optimize ergonomic calibration of the ergonomic digital human with the digital human simulation system.

In this example, the calibration indicators of the ergonomic digital human ensure that artistic evaluation indicators such as character design, model quality, and texture mapping of the ergonomic digital human reach high standards, such that the digital human further resembles a real human in appearance and behavior, and simulation fidelity of the digital human simulation system is improved. A high-quality ergonomic digital human delivers a more authentic and immersive virtual experience to the user. Fine calibration ensures that the digital human looks more natural and smooth in expression, action and the like, and the user feels more authenticity and immersion during the interaction process and shows more satisfaction with calibration management of the ergonomic digital human through the digital human simulation system. Fine-tuning the digital human through the calibration indicators ensures that the digital human shows stable performance during use with a low probability of malfunction or error, which helps to enhance overall stability and reliability of the digital human simulation system and reduce risks of system crashes or data loss caused by digital human anomalies.

Specifically, the appearance data and the action data of the ergonomic digital human specifically include:

the appearance data of the ergonomic digital human comprises a pupil diameter, maximum visual angle and distance from an inner canthus of a left eye to an inner canthus of a right eye of eyes of the ergonomic digital human, a length, width, nasal bridge height and nostril diameter of nose, a width, length and lip thickness of mouth, an auricle length, width, thickness and earhole diameter of ears, a contour area of face, and a height, weight, upper limb length, lower limb length and body surface area of the ergonomic digital human.

It should be noted that the appearance data of the ergonomic digital human can be acquired based on relevant research reports in the field of anthropometry.

The action data of the ergonomic digital human includes an average speed of the ergonomic digital human during a motion cycle, and a bending angle of each joint.

It should be noted that the above motion cycle of the ergonomic digital human refers to a duration when the ergonomic digital human starts from an initial state of action and finally returns to the initial state or enters a next action state after undergoing a series of action changes, and the motion cycle varies, depending on a specific action or task.

It should be noted that the average speed of the ergonomic digital human in the motion cycle is determined on the basis of dividing a motion distance of the ergonomic digital human in the motion cycle by time of the motion cycle, and the bending angle of each joint of the ergonomic digital human in the motion cycle is calculated with reference to a motion range of real human joints.

Specifically, the appearance data and the action data of the ergonomic digital human are specifically analyzed as follows:

The pupil diameter, maximum visual angle and distance from an inner canthus of a left eye to an inner canthus of a right eye of eyes of the ergonomic digital human are respectively compared to a reference pupil diameter, reference maximum visible angle and reference distance from an inner canthus of a left eye to an inner canthus of a right eye of the digital standard human preset in a digital standard human database, resulting ratios are multiplied by a correction factor corresponding to eye features preset in the digital standard human database, and then obtained products are summed to finally obtain an eye feature index of the ergonomic digital human.

It should be noted that the above correction factor corresponding to eye features refers to a proportional coefficient used to adjust a shape and size of eyes. Specifically, corresponding relationships of the eye features of the ergonomic digital human with historical changes in the pupil diameter, the maximum visible angle and the distance from an inner canthus of a left eye to an inner canthus of a right eye are fitted to obtain a fitting curve of the eye features, and then a real-time pupil diameter, maximum visible angle and distance from an inner canthus of a left eye to an inner canthus of a right eye are input into the fitting curve of the eye features to obtain the correction factor corresponding to the eye features in this example, with a value range of (0,1).

The length, width, nasal bridge height and nostril diameter of nose of the ergonomic digital human are respectively compared to a reference length, reference width, reference nasal bridge height and reference nostril diameter of nose of the digital standard human preset in the digital standard human database, resulting ratios are multiplied by a correction factor corresponding to nose features preset in the digital standard human database respectively, and then obtained products are summed to finally obtain a nose feature index of the ergonomic digital human.

It should be noted that the above correction factor corresponding to nose features refers to a parameter used to adjust a shape and size of nose. Specifically, corresponding relationships of the nose features of the ergonomic digital human with historical changes in the length, width, nasal bridge height and nostril diameter of nose are fitted to obtain a fitting curve of the nose features, and then a real-time length, width, nasal bridge height and nostril diameter of nose are input into the fitting curve of the nose features to obtain the correction factor corresponding to the nose features in this example, with a value range of (0,1).

The width, length and lip thickness of mouth of the ergonomic digital human are respectively compared to a reference width, length and lip thickness of mouth of the digital standard human preset in the digital standard human database, resulting ratios are multiplied by a correction factor corresponding to mouth features preset in the digital standard human database, and then obtained products are summed to finally obtain a mouth feature index of the ergonomic digital human.

It should be noted that the above correction factor corresponding to mouth features refers to a parameter used to adjust a shape and size of mouth to better align with characteristics of the digital human. Specifically, corresponding relationships of the mouth features of the ergonomic digital human with historical changes in the width, length and lip thickness of mouth of the ergonomic digital human are fitted to obtain a fitting curve of the mouth features, and then a real-time width, length and lip thickness of mouth are input into the fitting curve of the mouth features to obtain the correction factor corresponding to the mouth features in this example, with a value range of (0,1).

The auricle length, width, thickness and earhole diameter of ears of the ergonomic digital human are respectively compared to a reference auricle length, width, thickness and earhole diameter of ears of the digital standard human preset in the digital standard human database, resulting ratios are multiplied by a correction factor corresponding to ear features preset in the digital standard human database respectively, and then obtained products are summed to finally obtain an ear feature index of the ergonomic digital human.

It should be noted that the above correction factor corresponding to ear features refers to a parameter used to adjust a shape and size of ears to better align with ear characteristics of the digital human. Specifically, corresponding relationships of the ear features of the ergonomic digital human with historical changes in the auricle length, width, thickness and earhole diameter of ears of the ergonomic digital human are fitted to obtain a fitting curve of the ear features, and then a real-time auricle length, width, thickness and earhole diameter of ears are input into the fitting curve of the ear features to obtain the correction factor corresponding to the ear features in this example, with a value range of (0,1).

The contour area of face of the ergonomic digital human is compared to a reference contour area of face of the digital standard human preset in the digital standard human database, and a resulting ratio is multiplied by a correction factor corresponding to the contour area preset in the digital standard human database, to obtain a facial contour feature index of the ergonomic digital human.

It should be noted that the above correction factor corresponding to the contour area refers to a parameter used to adjust a shape and size of face to better align with face characteristics of the digital human. Specifically, a corresponding relationship between the face contour features of the ergonomic digital human and a historical change in the contour area is fitted to obtain a fitting curve of the face contour area, and then a real-time contour area is input into the fitting curve of the face contour area to obtain the correction factor corresponding to the contour area in this example, with a value range of (0,1).

The eye feature index of the ergonomic digital human, the nose feature index of the ergonomic digital human, the mouth feature index of the ergonomic digital human, the ear feature index of the ergonomic digital human, and the facial contour feature index of the ergonomic digital human are summed to finally obtain a facial component feature index of the ergonomic digital human.

The height, weight, upper limb length, lower limb length and body surface area of the ergonomic digital human are respectively compared to a reference height, weight, upper limb length, lower limb length and body surface area of the digital standard human preset in the digital standard human database, resulting ratios are multiplied by a correction factor corresponding to body surface features preset in the digital standard human database, and then obtained products are summed to finally obtain a body surface feature index of the ergonomic digital human.

It should be noted that the above correction factor corresponding to the body surface features refers to a parameter used to adjust sizes and proportions of different body parts of the ergonomic digital human. Specifically, corresponding relationships of the body surface features of the ergonomic digital human with historical changes in the height, weight, upper limb length and lower limb length of the ergonomic digital human are fitted to obtain a fitting curve of the body surface features, and then a real-time height, weight, upper limb length, lower limb length and body surface area of the ergonomic digital human are input into the fitting curve of the body surface features to obtain the correction factor corresponding to the body surface features of the ergonomic digital human in this example, with a value range of (0,1).

The average speed of the ergonomic digital human during a motion cycle and the bending angle of each joint are respectively compared to a reference average speed of the digital standard human during a motion cycle and a reference bending angle of each joint preset in the digital standard human database respectively, resulting ratios are multiplied by a correction factor corresponding to a motion state preset in the digital standard human database, and then obtained products are summed to finally obtain a motion state index of the ergonomic digital human.

It should be noted that the correction factor corresponding to a motion state refers to a parameter used to adjust the average speed of the ergonomic digital human during a motion cycle and the bending angle of each joint so as to more accurately reflect an actual motion state of the ergonomic digital human. Specifically, corresponding relationships of the motion state with historical changes in the average speed during a motion cycle and the bending angle of each joint that are obtained by observing and measuring actual human motion behaviors are fitted to obtain a fitting curve corresponding to motion state characteristics, and then a real-time average speed of the ergonomic digital human during a motion cycle and a real-time bending angle of each joint are input into the fitting curve corresponding to motion state characteristics to obtain the correction factor corresponding to motion state characteristics in this example, with a value range of (0, 1).

It should be noted that the bending angle of each joint is not fixed, but can be adjusted based on a type of motion, as illustrated in Table 1 Joint angle changes in various sports:

TABLE 1

Joint angle changes in various sports

| Sports | Hip joint angle change (degrees) | Knee joint angle change (degrees) | Ankle joint angle change (degrees) | Shoulder joint angle change (degrees) |
|---|---|---|---|---|
| Running | 30-45 | 45-60 | 20-30 | 20-35 |
| Swimming | 40-55 | 30-45 | 15-25 | 30-50 |
| Weightlifting | 90-120 | 130-150 | 30-40 | 70-90 |
| Yoga | 160-180 | 140-160 | 20-30 | 40-60 |
| Dance | 110-130 | 120-140 | 30-40 | 50-70 |
| Tennis | 60-80 | 70-90 | 25-35 | 40-60 |
| Basketball | 70-90 | 80-100 | 25-35 | 30-50 |

According to data in Table 1 Joint angle changes in various sports, different sports require different joint angle changes. In most sports, hip and knee joints exhibit larger angle changes, indicating that the two joints play a vital role in sports, especially in the sports that require running, jumping and rapid direction changes (such as basketball and tennis); and shoulder joints show considerable angle changes in sports that require large-scale upper limb movements (such as swimming and tennis), which significantly impacts sports performance. It should be noted that data listed in the above table are data of general observations, and actual joint angle changes in sports may vary due to individual differences.

The morphological calibration indicator of the ergonomic digital human is specifically analyzed as follows:

The facial component feature index of the ergonomic digital human, the body surface feature index of the ergonomic digital human, and the motion state index of the ergonomic digital human are comprehensively analyzed to obtain the morphological calibration indicator of the ergonomic digital human, with a specific analysis formula as follows:

$$\varphi_1 = \frac{\sqrt{(rw*y_1 + rt*y_2 + ry*y_3) + y_1*y_2*y_3}}{y_1*y_2*y_3};$$

Where $\varphi_1$ is a morphological calibration indicator of the ergonomic digital human. A larger facial component feature index of the ergonomic digital human indicates a large deviation between the appearance of the ergonomic digital human and that of an actual human, such that facial components of the ergonomic digital human may look unnatural or distorted, thereby affecting its fidelity and credibility in specific industry applications. A larger body surface feature index of the ergonomic digital human indicates a significant difference from an real human in appearance characteristics, such that the ergonomic digital human looks distorted or unnatural in appearance, and various parts of the ergonomic digital human appear to be disproportionate, such as incorrect body proportions, abnormal limb positions and the like. A larger motion state index of the ergonomic digital human indicates that the digital human in a specific motion state may look unnatural or distorted in a posture and action. For example, when the digital human is calibrated to a static state, but a motion state index indicates that the digital human is in motion, the posture and action of the digital human may be inconsistent with actual situations. By analyzing the morphological calibration indicator of the ergonomic digital human, the present disclosure facilitates adjustment of postures and actions of the ergonomic digital human to better align with actual human body characteristics and movement law, which helps to improve the accuracy and naturalness of the digital human's postures and actions.

rw is a facial component feature index of the ergonomic digital human, which refers to an indicator used to evaluate a size, shape and proportion characteristics of a facial component of the ergonomic digital human.

rt is a body surface feature index of the ergonomic digital human, which refers to a series of numerical indicators that reflect body surface features of the ergonomic human body.

ry is a motion state index of the ergonomic digital human, which refers to a series of numerical indicators that reflect performance and efficiency of the digital human in various motion states.

$y_1$ is a weight factor corresponding to the facial component features preset in the digital standard human database, $y_2$ is a weight factor corresponding to the body surface features preset in the digital standard human database, and $y_3$ is a weight factor corresponding to the motion state preset in the digital standard human database. The weight factor corresponding to the facial component features refers to a degree of influence of the facial component feature index of the ergonomic digital human on the morphological calibration indicator of the ergonomic digital human. Specifically, corresponding relationships of facial component feature changes with historical changes of facial components of the ergonomic digital human including changes in a pupil size, a mouth size, an ear size, and a face width and length respectively, are fitted to obtain a fitting curve corresponding to facial component features, and then real-time facial component feature data of the ergonomic digital human are input into the fitting curve corresponding to the facial component features to obtain the correction factor corresponding to the facial component features in this example, with a value range of (0, 1). The weight factor corresponding to the body surface features refers to a degree of influence of the body surface feature index of the ergonomic digital human on the morphological calibration indicator of the ergonomic digital human. Specifically, corresponding relationships of body surface feature changes with historical changes of the ergonomic digital human including changes in a height, weight and limb length respectively, are fitted to obtain a fitting curve corresponding to the body surface features, and then real-time height, weight and limb length of the ergonomic digital human are input into the fitting curve corresponding to the body surface features to obtain the correction factor corresponding to the body surface features in this example, with a value range of (0, 1). The weight factor corresponding to the motion state refers to a degree of influence of the motion state index of the ergonomic digital human on the morphological calibration indicator of the ergonomic digital human. Specifically, corresponding relationships of motion state changes of the ergonomic digital human with historical changes in the motion speed and the bending angle of each joint respectively, are fitted to obtain a fitting curve corresponding to the motion state, and then a real-time motion speed and a real-time bending angle of each joint of the ergonomic digital human are input into the fitting curve corresponding to the motion state to obtain the correction factor corresponding to the motion state in this example, with a value range of (0, 1). Weights are allocated according to the degrees of influence of the facial component features, the body surface features and the motion state on the morphological calibration indicator of the ergonomic digital human, $y_1+y_2+y_3=1$.

Specifically, the expression data and the voice data of the ergonomic digital human specifically include:

The expression data of the ergonomic digital human includes a curvature of mouth corner corresponding to each expression of the ergonomic digital human, and a distance between a center point of an upper eyelid and a center point of a lower eyelid of the ergonomic digital human.

It should be noted that the expression data of the ergonomic digital human is obtained based on actual measurement of expression changes of the ergonomic digital human.

The curvature of mouth corner corresponding to each expression of the ergonomic digital human is subtracted by an initial curvature of mouth corner of the digital standard human preset in the digital standard human database to obtain a curvature of mouth corner change in the ergonomic digital human, and is multiplied by an influence factor corresponding to a unit value of a curvature of mouth corner change preset in a digital standard human database to obtain a mouth corner change index of the ergonomic digital human.

It should be noted that the initial curvature of mouth corner of the digital standard human is determined based on general expression characteristics of a human mouth in a natural and relaxed state. For the influence factor corresponding to a unit value of a curvature of mouth corner change, a corresponding relationship between mouth corner change characteristics and historical changes in the curvature of mouth corner corresponding to each expression of the ergonomic digital human is fitted to obtain a fitting curve corresponding to the curvature of mouth corner change, and then a real-time curvature of mouth corner change is input into the fitting curve corresponding to the motion state to obtain the influence factor corresponding to a unit value of a curvature of mouth corner change in this example, with a value range of (0, 1).

It should also be noted that different expressions correspond to different curvatures of mouth corner, and curvatures of mouth corner corresponding to specific expressions are shown in Table 2 Correspondence between expressions and curvatures of mouth corner:

TABLE 2

Correspondence between expressions and curvatures of mouth corner

| Expression | Curvature of mouth corner (degrees) |
| --- | --- |
| Smile | [15, 30) |
| Laugh | [30, 50) |
| Bitter smile | [5, 15) |
| Neutral | [0, 5) |
| Slightly displeased | [−5, 0) |
| Dissatisfied | [−10, −5) |
| Angry | [−15, −10) |
| Disgusted | (0, −10) |

It should be noted that the curvature of mouth corner refers to an upward or downward angle of mouth corner, where a positive degree indicates an upward curvature of mouth corner, and a negative degree indicates a downward curvature of mouth corner. Data from Table 1 shows that different expressions correspond to different curvatures of mouth corner: smile [15, 30), with the mouth corner moved upward slightly, conveys pleasure and satisfaction, and signals friendliness and acceptance; neutral [0, 5) in the facial expression, being almost unchanged in the mouth corner, reflects emotional stability, without obvious positive or negative emotional expression, emotional fluctuations or calm facial expressions; and angry [−15, −10), with the mouth corner moved downward significantly, often accompanied by furrowed brows and a stern gaze, indicates anger or extreme dissatisfaction, and sends a clear signal of being very dissatisfied or angry about something.

The distance between a center point of an upper eyelid and a center point of a lower eyelid of the ergonomic digital human is subtracted by an initial distance between a center point of an upper eyelid and a center point of a lower eyelid of the digital standard human preset in the digital standard human database to obtain an eye opening/closing degree of the ergonomic digital person, and is multiplied by an influence factor corresponding to a unit value of an eye opening/closing degree preset in the digital standard human database to obtain an eye opening/closing index of the ergonomic digital person.

It should be noted that the above initial distance between a center point of an upper eyelid and a center point of a lower eyelid of the digital standard human is determined based on standards of ocular aesthetics. For the influence factor corresponding to a unit value of an eye opening/closing degree, a corresponding relationship between a change in the eye opening/closing degree and a historical change in the distance between a center point of an upper eyelid and a center point of a lower eyelid of the ergonomic digital human, is fitted to obtain a fitting curve corresponding to the eye opening/closing degree, and then a real-time eye opening/closing degree of the ergonomic digital human is input into the fitting curve corresponding to the eye opening/closing degree to obtain the influence factor corresponding to a unit value of an eye opening/closing degree in this example, with a value range of (0, 1).

The mouth corner change index of the ergonomic digital human and the eye opening/closing index of the ergonomic digital person are summed to obtain an expression change index of the ergonomic digital human.

The voice data of the ergonomic digital human includes an average decibel of the ergonomic digital human's voice and an average speech rate of the ergonomic digital human.

It should be noted that the voice data of the ergonomic digital human is obtained by recording voices of the ergonomic digital human through a professional audio acquisition device, and the voice data is imported into audio editing software. According to an average decibel function of an entire audio file provided by the audio editing software, an entire voice sample is selected for calculation to obtain an average decibel of the voice of the ergonomic digital human. Additionally, a speech rate analysis function of the audio editing software is used for speech rate measurement of the ergonomic digital human. According to speech rate measurement results provided by the software, multiple speech rates measured are averaged to obtain an average speech rate of the ergonomic digital human.

Specifically, the functional calibration indicator of the ergonomic digital human is specifically analyzed as follows:

The expression change index of the ergonomic digital human, the average decibel of the ergonomic digital human's voice and the average speech rate of the ergonomic digital human are comprehensively processed to obtain the functional calibration indicator of the ergonomic digital human, with a specific analysis formula as follows:

$$\eta = \ln\left(Y * u_1 + \frac{|dba - \Delta dba|}{\Delta dba} * u_2 + \frac{|yt - \Delta yt|}{\Delta yt} * u_3 + 1\right);$$

Where η is a functional calibration indicator of the ergonomic digital human. When the expression change index of the ergonomic digital human is large, but impacts of expression changes on functionality of the digital human are not fully considered in the functional calibration indicator, inconsistency may exist between the expression and the functionality of the digital human. For example, when facial expressions of sadness or anger of the digital human are inconsistent with actual functions, the user may feel confused or dissatisfied at an interaction therewith due to inaccurate or confusing information received, such that user experience is compromised. At a low decibel of the ergonomic digital human's voice, the user can hardly hear clearly any message or instruction conveyed by the digital human. When the decibel of the ergonomic digital human's voice is too high, the user may suffer from hearing damage or hearing loss due to prolonged exposure in the high-decibel environment, and the high-decibel voice may induce discomfort of the user, thereby reducing quality of interaction between the user and the digital human. Speaking too slowly or too fast may hinder communication with the digital human, and when the digital human speaks too fast, the user maybe cannot keep up with pace of the digital human and encounter difficulties in understanding. However, when digital human speaks too slowly, the user may feel that waiting time is too long, thereby affecting fluency and efficiency of communication. By analyzing various data of the functional calibration indicator of the ergonomic digital human, the present disclosure enables the digital human to express various emotional states more accurately and achieve more authentic expression and voice of the digital human, and authentic expression and voice enhance the user's emotional resonance, emotional communication and interaction with the ergonomic digital human.

γ is an expression change index of the ergonomic digital human, which refers to an indicator used to describe refinement and naturalness of expression changes of the ergonomic digital human.

dba is an average decibel of the ergonomic digital human's voice, which refers to an average volume of the ergonomic digital human's actual voice.

Δdba is an average decibel of the digital standard human's voice preset in the digital standard human database, which refers to an average volume of the digital standard human's actual voice.

yt is an average speech rate of the ergonomic digital human, which refers to an average number of syllables, words or sentences output by the ergonomic digital human per unit time during a voice interaction.

Δyt is an average speech rate of the digital standard human preset in the digital standard human database, which refers to an average number of syllables, words or sentences output by the digital standard human during a voice interaction.

$u_1$ is a weight factor corresponding to the expression change index preset in the digital standard human database, $u_2$ is a correction factor corresponding to the ergonomic digital human's voice decibel preset in the digital standard human database, and $u_3$ is a correction factor corresponding to the ergonomic digital human's speech rate preset in the digital standard human database. The weight factor corresponding to the expression change index refers to a degree of influence of the expression change index on the functional calibration indicator of the ergonomic digital human. Specifically, corresponding relationships of expression changes with historical changes in the eye opening/closing degree and the curvature of mouth corner of the ergonomic digital human, are fitted to obtain a fitting curve corresponding to the expression change index, and then real-time changes in the eye opening/closing degree and the curvature of mouth corner of the ergonomic digital human are input into the fitting curve corresponding to the expression change index to obtain the weight factor corresponding to the expression change index in this example, with a value range of (0, 1). The correction factor corresponding to the ergonomic digital human's voice decibel refers to a degree of influence of changes in the ergonomic digital human's voice decibel on the functional calibration indicator of the ergonomic digital human. Specifically, a corresponding relationship between historical changes in a voice monitoring distance-based decibel of the ergonomic digital human and function changes of the ergonomic digital human, is fitted to obtain a fitting curve corresponding to the average decibel of voice, and then a real-time voice monitoring distance of the ergonomic digital human is input into the fitting curve corresponding to the average decibel of voice to obtain the weight factor corresponding to the expression change index in this example, with a value range of (0, 1). The correction factor corresponding to the ergonomic digital human's speech rate refers to a degree of influence of changes in the ergonomic digital human's speech rate on the functional calibration indicator of the ergonomic digital human. Specifically, a corresponding relationship between historical changes in the speech rate of the ergonomic digital human in each emotional state and functional expression changes of the ergonomic digital human, is fitted to obtain a fitting curve corresponding to the average speech rate of the ergonomic digital human, and then a real-time speech rate of the ergonomic digital human in an emotional state is input into the fitting curve corresponding to the average speech rate to obtain the correction factor corresponding to the ergonomic digital human's speech rate in this example, with a value range of (0, 1).

Further, the interaction calibration indicator of the ergonomic digital human is specifically analyzed as follows:

The interaction data of the ergonomic digital human includes a total number of interactions, an information input termination time point corresponding to each interaction, an interaction response start time point corresponding to each interaction, and an interaction response end time point corresponding to each interaction.

It should be noted that the total number of interactions, the information input termination time point corresponding to each interaction, the interaction response start time point corresponding to each interaction, and the interaction response end time point corresponding to each interaction can be obtained from a log file about interactions of the ergonomic digital human.

The interaction response start time point corresponding to each interaction of the ergonomic digital human is subtracted by the information input termination time point corresponding to each interaction to obtain a response waiting duration of each interaction of the ergonomic digital human.

The interaction response end time point corresponding to each interaction of the ergonomic digital human is subtracted by the interaction response start time point corresponding to each interaction to obtain a response waiting duration of each interaction of the ergonomic digital human.

Figure 3:
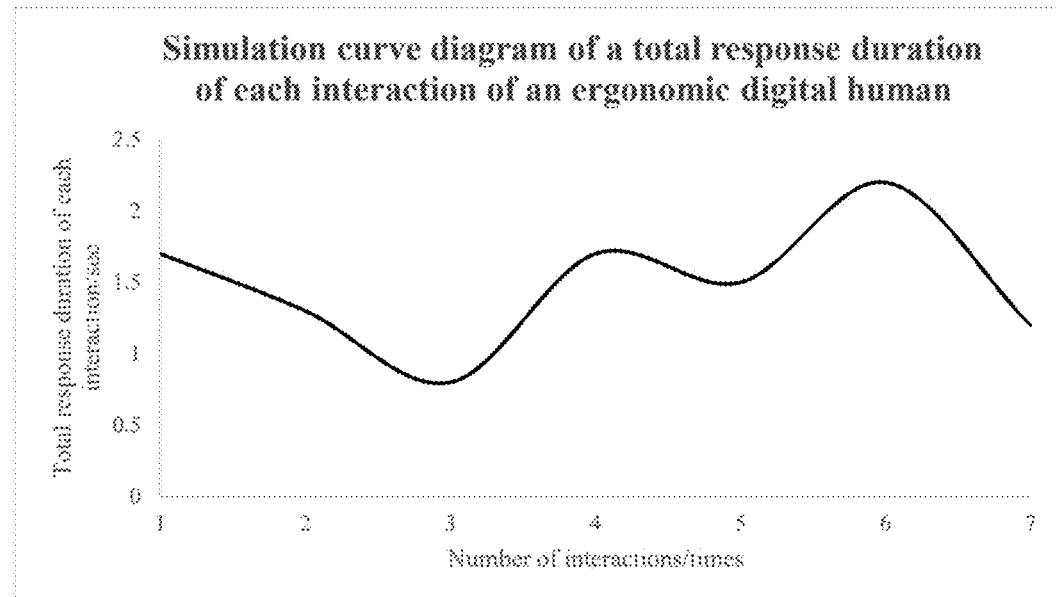
FIG. 3 is a simulation curve diagram of a total response duration of each interaction of an ergonomic digital human of the present disclosure.

It should be noted that a total response duration of each interaction of the ergonomic digital human is obtained by summing the response waiting duration of each interaction of the ergonomic digital human and a response duration of each interaction of the ergonomic digital human. A simulation curve on changes of each interaction and the total response duration of each interaction of the ergonomic digital human is illustrated in FIG. 3 that is a simulation curve diagram of the total response duration of each interaction of an ergonomic digital human. In the figure, a horizontal axis represents the number of interactions in times, and a vertical axis represents a total response duration of each interaction in seconds.

Results of observing FIG. 3 as the simulation curve diagram of a total response duration of each interaction of an ergonomic digital human show that the total response duration of each interaction will not be prolonged with an increase in interactions, but will change with the difficulty of each interaction, indicating that the ergonomic digital human can adjust response time according to the difficulty of an interaction. For example, the ergonomic digital human can quickly respond to and complete a simple interaction such as a third interaction, and more time may be needed to process and respond to a complex interaction such as a sixth interaction.

The total number of interactions of the ergonomic digital human, the response waiting duration of each interaction of the ergonomic digital human, and the response duration of each interaction of the ergonomic digital human are comprehensively analyzed to obtain the interaction calibration indicator of the ergonomic digital human, with a specific analysis formula as follows:

$$T = \left[\sum_{i=1}^{N}\left(\frac{|Ts_i - Te|}{Te} * T_1 + \frac{|Tx_i - \Delta Tx|}{\Delta Tx} * T_2\right)\right] * \frac{1}{N};$$

where τ is an interaction calibration indicator of the ergonomic digital human. A longer response waiting duration of interaction indicates that the ergonomic digital human takes a long time to respond to a user interaction instruction, which will degrade user satisfaction and experience, and make the user feel impatient due to long waiting time, thereby affecting an overall interaction process. The longer waiting time directly affects interaction efficiency, and makes the entire interaction process become slow and inefficient. A long interaction response duration indicates that the ergonomic digital human takes a long time to process, analyze and execute a user instruction. As the user usually expects fast and immediate interaction responses, longer response time will reduce the user's satisfaction and trust in the ergonomic digital human, and the user maybe doubts reliability and practicality of the digital human, and even doubts interaction results, thereby affecting subsequent interaction behaviors. By analyzing various data in the interaction calibration indicator of the ergonomic digital human, the present disclosure improves interaction accuracy and response speed of the ergonomic digital human. Calibration of the interaction data makes the interactions and responses of the digital human more natural, smooth and targeted, thereby enhancing the user experience and satisfaction.

$Ts_i$ is a response waiting duration of an $i^{th}$ interaction of the ergonomic digital human, which refers to a duration from a moment when the user sends an interaction instruction to a moment when the ergonomic digital human receives the interaction instruction.

Te is a response waiting duration of interaction of the digital standard human preset in the digital standard human database, which refers to a maximum allowable duration from a moment when the user sends an interaction instruction to a moment when the digital standard human receives the interaction instruction.

$Tx_i$ is a response duration of the $i^{th}$ interaction of the ergonomic digital human, which refers to a duration from a moment when the ergonomic digital human receives an interaction instruction from the user to a moment when the ergonomic digital human completely processes the instruction and gives corresponding feedback or executes a corresponding operation.

$\Delta Tx$ is a response duration of interaction of the digital standard human preset in the digital standard human database, which refers to a maximum duration from a moment when the ergonomic digital human receives an interaction instruction from the user to a moment when the ergonomic digital human completely processes the instruction and gives corresponding feedback or executes a corresponding operation.

$T_1$ is a correction factor corresponding to the response waiting duration of interaction of the digital standard human preset in the digital standard human database, and $T_2$ is a correction factor corresponding to the response duration of interaction of the digital standard human preset in the digital standard human database. The correction factor corresponding to the response waiting duration of interaction refers to a degree of influence of the response waiting duration of interaction on the interaction calibration indicator of the ergonomic digital human. Specifically, a corresponding relationship between historical changes in the response waiting duration of each instruction task of the ergonomic digital human and changes in the response waiting duration of interaction, is fitted to obtain a fitting curve corresponding to the response waiting duration, and then a real-time response waiting duration of instruction task is input into the fitting curve corresponding to the response waiting duration to obtain the correction factor corresponding to the response waiting duration of interaction in this example, with a value range of (0, 1). The correction factor corresponding to the response duration of interaction refers to a degree of influence of the response duration of interaction on the interaction calibration indicator of the ergonomic digital human. Specifically, a corresponding relationship between historical changes in the interaction response duration of each instruction task of the ergonomic digital human and changes in an instruction interaction, is fitted to obtain a fitting curve corresponding to the response duration of interaction, and then a real-time interaction response duration of an instruction task of the ergonomic digital human is input into the fitting curve corresponding to the response duration of interaction to obtain the correction factor corresponding to the response duration of interaction in this example, with a value range of (0, 1).

i is the number of each interaction, i=1, 2, 3, ..., N, where N is the total number of interactions.

Specifically, the calibration evaluation indicator of the ergonomic digital human with a digital human simulation system is specifically analyzed as follows:

The morphological calibration indicator, the functional calibration indicator and the interaction calibration indicator of the ergonomic digital human are comprehensively analyzed to finally obtain the calibration evaluation indicator of the ergonomic digital human with a digital human simulation system, with a specific analysis formula as follows:

$$\delta = e^{\frac{(\varphi_1 * f_1 + \eta * f_2 + \tau * f_3)}{f_1 * f_2 * f_3}};$$

where $\delta$ is a calibration evaluation indicator of the ergonomic digital human with a digital human simulation system. The morphological calibration indicator of the ergonomic digital human directly relates to fidelity of appearance and action. When the morphological calibration indicator is low, the digital human will look unnatural in the appearance, and look stiff or uncoordinated in the action, which will affect the user's intuitive feeling when interacting with the digital human and reduce naturalness and fluency of the interaction. A low interaction calibration indicator of the ergonomic digital human indicates poor interaction calibration, which may delay the digital human's response to the user, maybe because the digital human needs more time to process and understand the user's request, or due to system delay and poor response. By analyzing various data of the calibration evaluation indicator of the ergonomic digital human, the present disclosure enables the digital human to better understand and respond to the user's needs and behaviors, thereby making the interactions more humanized and personalized.

e is a natural constant, $\varphi_1$ is a morphological calibration indicator of the ergonomic digital human, $\eta$ is a functional calibration indicator of the ergonomic digital human, and $\tau$ is an interaction calibration indicator of the ergonomic digital human.

$f_1$ is a weight factor of the morphological calibration indicator of the ergonomic digital human preset in the digital standard human database, $f_2$ is a weight factor of the functional calibration indicator of the ergonomic digital human preset in the digital standard human database, and $f_3$ is a weight factor of the interaction calibration indicator of the ergonomic digital human preset in the digital standard human database.

It should be noted that the weight factor of the morphological calibration indicator of the ergonomic digital human refers to a degree of influence of changes in the morphological calibration indicator of the ergonomic digital human on the calibration evaluation indicator of the ergonomic digital human. Specifically, a corresponding relationship between historical changes in a height and weight of the ergonomic digital human and morphological changes of the ergonomic digital human is fitted to obtain a fitting curve corresponding to morphological calibration of the ergonomic digital human, and then real-time changes in the height and weight of the ergonomic digital human are input into the fitting curve corresponding to morphological calibration of the ergonomic digital human to obtain the weight factor of the morphological calibration indicator of the ergonomic digital human in this example, with a value range of (0, 1). The weight factor of the functional calibration indicator of the ergonomic digital human preset in the digital standard human database refers to a degree of influence of changes in the functional calibration indicator of the ergonomic digital human on the calibration evaluation indicator of the ergonomic digital human. Specifically, a corresponding relationship between historical changes in a voice decibel and speech rate of the ergonomic digital human and functional calibration changes of the ergonomic digital human, is fitted to obtain a fitting curve corresponding to the functional calibration indicator of the ergonomic digital human, and then a real-time voice decibel and a historical speech rate of the ergonomic digital human are input into the fitting curve corresponding to the functional calibration indicator of the ergonomic digital human to obtain the weight factor of the functional calibration indicator of the ergonomic digital human in this example, with a value range of (0, 1). The weight factor of the interaction calibration indicator of the ergonomic digital human refers to a degree of influence of changes in the interaction calibration indicator of the ergonomic digital human on the calibration evaluation indicator of the ergonomic digital human. Specifically, a corresponding relationship between historical changes in the interaction duration of the ergonomic digital human and interaction calibration changes, is fitted to obtain a fitting curve corresponding to the interaction calibration indicator, and then a real-time interaction duration of the ergonomic digital human is input into the fitting curve corresponding to the interaction calibration indicator to obtain the weight factor of the interaction calibration indicator in this example, with a value range of (0, 1).

Specifically, the ergonomic calibration of the ergonomic digital human with the digital human simulation system is specifically optimized as follows:

The calibration evaluation indicator of the ergonomic digital human with a digital human simulation system is compared with the preset reference indicator of digital standard human calibration to obtain a calibration accuracy value of the ergonomic digital human, and then matched with a calibration optimization strategy corresponding to each calibration accuracy value interval of the ergonomic digital human to obtain a calibration optimization strategy of the ergonomic digital human, so as to optimize the ergonomic calibration of the ergonomic digital human with the digital human simulation system.

It should be noted that the reference indicator of digital standard human calibration is derived from historical calibration data of the digital standard human and opinions of digital standard human calibration experts, and is stored in the digital standard human database. In this example, the reference indicator of digital standard human calibration is any rational number between 0 and 1.

In this example, a process of matching a calibration optimization strategy of the ergonomic digital human is as follows:

According to a calibration optimization strategy corresponding to each calibration accuracy interval of the ergonomic digital human, a calibration accuracy value of the ergonomic digital human is divided into three intervals: The first interval is (0, 3], the second interval is (3, 6.5], and the third interval consists of all values greater than 6.5. The three intervals correspond to three calibration optimization strategies respectively. When a calibration accuracy value of the ergonomic digital human is in the interval of (0, 3], it may indicate that the calibration accuracy of the ergonomic digital human is low, thereby necessitating more fine adjustment or additional data collection for the ergonomic digital human, including re-evaluating a calibration process, optimizing a calibration algorithm, and collecting more representative training data. When the calibration accuracy value of the ergonomic digital human is in the interval of (3, 6.5], it means that the calibration accuracy is relatively favorable, but there is still room for improvement. In this case, fine-tuning optimization can be achieved by making slight adjustments to calibration parameters, optimizing feature selection, or adopting more advanced calibration technology. When the calibration accuracy value of the ergonomic digital human is greater than 6.5, it means that the calibration accuracy is very high with excellent performance achieved. In this case, main optimization strategies include maintaining a current calibration status, regularly checking and updating data, and monitoring performance degradation of the ergonomic digital human to ensure long-term stable operation.

Figure 2:
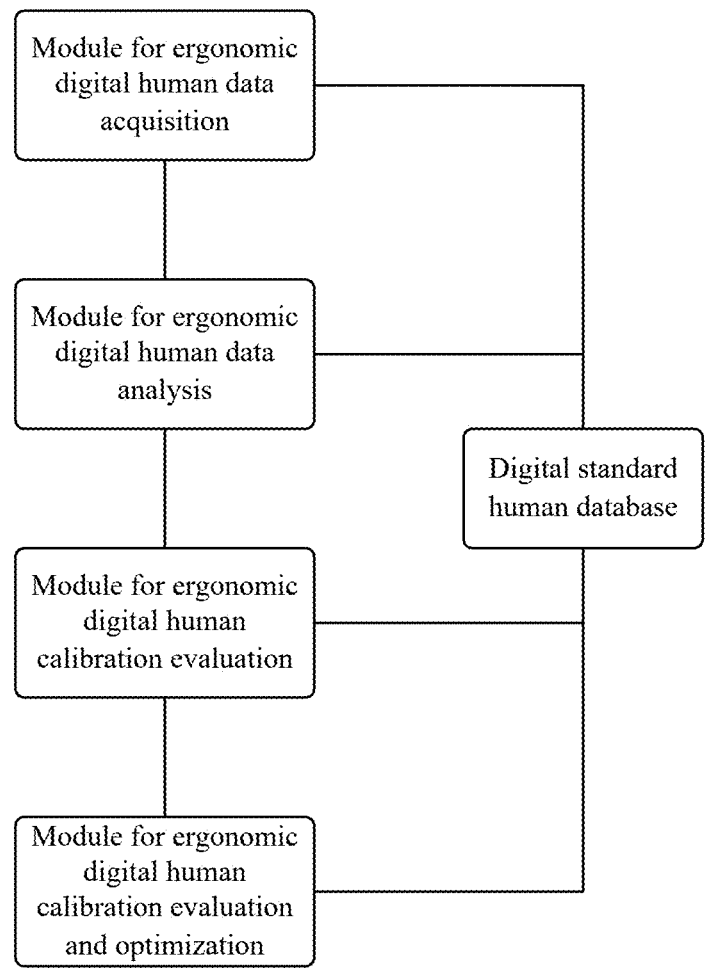
FIG. 2 is a schematic diagram of connection of system modules of the present disclosure.

With reference to FIG. 2, in a second aspect, the present disclosure provides a system for calibrating an ergonomic digital human based on a digital standard human. The system includes: a module for ergonomic digital human data acquisition, a module for ergonomic digital human data analysis, a module for ergonomic digital human calibration evaluation, and a module for ergonomic digital human calibration evaluation and optimization.

In a second aspect, the present disclosure provides a system for calibrating an ergonomic digital human based on a digital standard human, further including a digital standard human database where the correction factor corresponding to eye features, the correction factor corresponding to nose features, the correction factor corresponding to mouth features, the correction factor corresponding to ear features, the correction factor corresponding to body surface features, the correction factor corresponding to a motion state, the influence factor corresponding to a unit value of a curvature of mouth corner change, the influence factor corresponding to a unit value of an eye opening/closing degree, the weight factor of the morphological calibration indicator of the ergonomic digital human, the weight factor of the functional calibration indicator, the weight factor of the interaction calibration indicator, the reference indicator of digital standard human calibration, the reference pupil diameter of the digital standard human, the maximum visible angle, the reference distance from an inner canthus of a left eye to an inner canthus of a right eye, the reference length, reference width, reference nasal bridge height and reference nostril diameter of nose of the digital standard human preset in the digital standard human database, the reference width, length and lip thickness of mouth of the digital standard human, the reference auricle length, width, thickness and earhole diameter of ears of the digital standard human, the reference contour area of face of the digital standard human, the reference height, weight, upper limb length, lower limb length and body surface area of the digital standard human preset in the digital standard human database, the reference average speed of the digital standard human during a motion cycle, the reference bending angle of each joint preset, the initial curvature of mouth corner of the digital standard human, the initial distance between a center point of an upper eyelid and a center point of a lower eyelid of the digital standard human, the average decibel of the digital standard human's voice, the average speech rate of the digital standard human, the weight factor corresponding to the expression change index, the correction factor corresponding to the ergonomic digital human's voice decibel, the correction factor corresponding to the ergonomic digital human's speech rate, the response duration of interaction of the digital standard human, the response waiting duration of interaction of the digital standard human, the weight factor of the morphological calibration indicator of the ergonomic digital human, the weight factor of the functional calibration indicator of the ergonomic digital human, and the weight factor of the interaction calibration indicator of the ergonomic digital human are stored.

The module for ergonomic digital human data acquisition is connected to the module for ergonomic digital human data analysis, the module for ergonomic digital human data analysis is connected to the module for ergonomic digital human calibration evaluation, the module for ergonomic digital human calibration evaluation is connected to the module for ergonomic digital human calibration evaluation and optimization, and the digital standard human database is connected to the module for ergonomic digital human data acquisition, the module for ergonomic digital human data analysis, the module for ergonomic digital human calibration evaluation, and the module for ergonomic digital human calibration evaluation and optimization.

The module for ergonomic digital human data acquisition, is configured for acquiring appearance data, action data, expression data, voice data and interaction data of an ergonomic digital human with a digital human simulation system.

The module for ergonomic digital human data analysis, is configured for analyzing the appearance data and the action data of the ergonomic digital human to obtain a morphological calibration indicator of the ergonomic digital human, analyzing the expression data and the voice data of the ergonomic digital human to obtain a functional calibration indicator of the ergonomic digital human, and analyzing the interaction data of the ergonomic digital human to obtain an interaction calibration indicator of the ergonomic digital human.

The module for ergonomic digital human calibration evaluation, is configured for comprehensively analyzing the morphological calibration indicator, the functional calibration indicator and the interaction calibration indicator of the ergonomic digital human to obtain a calibration evaluation indicator of the ergonomic digital human with a digital human simulation system.

The module for ergonomic digital human calibration evaluation and optimization, is configured for comparing the calibration evaluation indicator of the ergonomic digital human with a digital human simulation system with a preset reference indicator of digital standard human calibration, and finally optimizing ergonomic calibration of the ergonomic digital human with the digital human simulation system.

The above contents are merely examples and descriptions of a structure of the present disclosure. Those skilled in the art to which the present disclosure pertains can make various modifications or additions to the specific examples described or replace same in a similar manner, as long as they do not deviate from the structure of the present disclosure or go beyond the scope defined by the specification. All should fall within the scope of protection of the present disclosure.

The invention claimed is:
1. A method for calibrating an ergonomic digital human based on a digital standard human, performed by a computer device, and comprising:
S1, acquiring ergonomic digital human data comprising: acquiring appearance data, action data, expression data, voice data, and interaction data of an ergonomic digital human in a digital human simulation system; wherein the digital human simulation system is a piece of software that improves action accuracy of the ergonomic digital human and reduces an interaction error rate of the ergonomic digital human; the ergonomic digital human is a digital human object that needs to be ergonomically calibrated in the digital human simulation system;
S2, analyzing the ergonomic digital human data comprising: analyzing the appearance data and the action data of the ergonomic digital human to obtain a morphological calibration indicator of the ergonomic digital human, analyzing the expression data and the voice data of the ergonomic digital human to obtain a functional calibration indicator of the ergonomic digital human, and analyzing the interaction data of the ergonomic digital human to obtain an interaction calibration indicator of the ergonomic digital human;
S3, calibrating and evaluating the ergonomic digital human comprising: comprehensively analyzing the morphological calibration indicator, the functional calibration indicator and the interaction calibration indicator of the ergonomic digital human to obtain a calibration evaluation indicator of the ergonomic digital human in the digital human simulation system;
S4, optimizing the calibration evaluation indicator of the ergonomic digital human comprising: comparing the calibration evaluation indicator of the ergonomic digital human in the digital human simulation system with a preset calibration reference indicator of digital standard human, and finally optimizing ergonomic calibration of the ergonomic digital human in the digital human simulation system; wherein the digital standard human is a reference object for performing ergonomic calibration on the ergonomic digital human, and is defined by standardized parameters stored in a digital standard human database;
wherein a specific process of analyzing the morphological calibration indicator of the ergonomic digital human is that:
a facial component feature index of the ergonomic digital human, a body surface feature index of the ergonomic digital human, and a motion state index of the ergonomic digital human are comprehensively analyzed to obtain the morphological calibration indicator of the ergonomic digital human;
wherein a specific process of analyzing the functional calibration indicator of the ergonomic digital human is that:
an expression change index of the ergonomic digital human, an average decibel of a voice of the ergonomic digital human and an average speech rate of the ergonomic digital human are comprehensively processed to obtain the functional calibration indicator of the ergonomic digital human;

wherein a specific process of analyzing the interaction calibration indicator of the ergonomic digital human is that:

the interaction data of the ergonomic digital human comprises a total number of interactions, an information input termination time point corresponding to each interaction, an interaction response start time point corresponding to each interaction, and an interaction response end time point corresponding to each interaction;

the information input termination time point corresponding to each interaction is subtracted from the interaction response start time point corresponding to each interaction of the ergonomic digital human to obtain a response waiting duration of each interaction of the ergonomic digital human;

the interaction response start time point corresponding to each interaction of the ergonomic digital human is subtracted from the interaction response end time point corresponding to each interaction of the ergonomic digital human to obtain a response duration of each interaction of the ergonomic digital human; and the total number of interactions of the ergonomic digital human, the response waiting duration of each interaction of the ergonomic digital human, and the response duration of each interaction of the ergonomic digital human are comprehensively analyzed to obtain the interaction calibration indicator of the ergonomic digital human.

2. The method for calibrating an ergonomic digital human based on a digital standard human according to claim 1, wherein the appearance data and the action data of the ergonomic digital human comprise:

the appearance data of the ergonomic digital human comprises a pupil diameter, maximum visual angle and distance from an inner canthus of a left eye to an inner canthus of a right eye of eyes of the ergonomic digital human, a length, width, nasal bridge height and nostril diameter of nose, a width, length and lip thickness of mouth, an auricle length, width, thickness and earhole diameter of ears, a contour area of face, and a height, weight, upper limb length, lower limb length and body surface area of the ergonomic digital human; and the action data of the ergonomic digital human comprises an average speed of the ergonomic digital human during a motion cycle, and a bending angle of each joint.

3. The method for calibrating an ergonomic digital human based on a digital standard human according to claim 2, wherein the appearance data and the action data of the ergonomic digital human are analyzed as follows:

the pupil diameter, maximum visual angle and distance from an inner canthus of a left eye to an inner canthus of a right eye of eyes of the ergonomic digital human are compared to a reference pupil diameter, reference maximum visible angle and reference distance from an inner canthus of a left eye to an inner canthus of a right eye of the digital standard human preset in a digital standard human database, resulting ratios are multiplied by a correction factor corresponding to eye features preset in the digital standard human database, and then obtained products are summed to obtain an eye feature index of the ergonomic digital human;

the length, width, nasal bridge height and nostril diameter of nose of the ergonomic digital human are compared to a reference length, reference width, reference nasal bridge height and reference nostril diameter of nose of the digital standard human preset in the digital standard human database, resulting ratios are multiplied by a correction factor corresponding to nose features preset in the digital standard human database, and then obtained products are summed to obtain a nose feature index of the ergonomic digital human;

the width, length and lip thickness of mouth of the ergonomic digital human are compared to a reference width, length and lip thickness of mouth of the digital standard human preset in the digital standard human database, resulting ratios are multiplied by a correction factor corresponding to mouth features preset in the digital standard human database, and then obtained products are summed to obtain a mouth feature index of the ergonomic digital human;

the auricle length, width, thickness and earhole diameter of ears of the ergonomic digital human are compared to a reference auricle length, width, thickness and earhole diameter of ears of the digital standard human preset in the digital standard human database, resulting ratios are multiplied by a correction factor corresponding to ear features preset in the digital standard human database, and then obtained products are summed to obtain an ear feature index of the ergonomic digital human;

the contour area of face of the ergonomic digital human is compared to a reference contour area of face of the digital standard human preset in the digital standard human database, and a resulting ratio is multiplied by a correction factor corresponding to the contour area preset in the digital standard human database, to obtain a face feature index of the ergonomic digital human;

the eye feature index of the ergonomic digital human, the nose feature index of the ergonomic digital human, the mouth feature index of the ergonomic digital human, the ear feature index of the ergonomic digital human, and the facial contour feature index of the ergonomic digital human are summed to obtain a facial component feature index of the ergonomic digital human;

the height, weight, upper limb length, lower limb length and body surface area of the ergonomic digital human are compared to a reference height, weight, upper limb length, lower limb length and body surface area of the digital standard human preset in the digital standard human database respectively, resulting ratios are multiplied by a correction factor corresponding to body surface features preset in the digital standard human database, and then obtained products are summed to obtain a body surface feature index of the ergonomic digital human; and the average speed of the ergonomic digital human during a motion cycle and the bending angle of each joint are compared to a reference average speed of the digital standard human during a motion cycle and a reference bending angle of each joint preset in the digital standard human database respectively, resulting ratios are multiplied by a correction factor corresponding to a motion state preset in the digital standard human database, and then obtained products are summed to obtain a motion state index of the ergonomic digital human.

4. The method for calibrating an ergonomic digital human based on a digital standard human according to claim 1, wherein the appearance data and the action data of the ergonomic digital human comprise:

the expression data of the ergonomic digital human comprises a curvature of mouth corner corresponding to each expression of the ergonomic digital human, and a distance between a center point of an upper eyelid and a center point of a lower eyelid of the ergonomic digital human;

the curvature of mouth corner corresponding to each expression of the ergonomic digital human is subtracted by an initial curvature of mouth corner of the digital standard human preset in the digital standard human database to obtain a curvature of mouth corner change in the ergonomic digital human, and is multiplied by an influence factor corresponding to a unit value of a curvature of mouth corner change preset in a digital standard human database to obtain a mouth corner change index of the ergonomic digital human;

the distance between a center point of an upper eyelid and a center point of a lower eyelid of the ergonomic digital human is subtracted by an initial distance between a center point of an upper eyelid and a center point of a lower eyelid of the digital standard human preset in the digital standard human database to obtain an eye opening/closing degree of the ergonomic digital person, and is multiplied by an influence factor corresponding to a unit value of an eye opening/closing degree preset in the digital standard human database to obtain an eye opening/closing index of the ergonomic digital person;

the mouth corner change index of the ergonomic digital human and the eye opening/closing index of the ergonomic digital person are summed to obtain an expression change index of the ergonomic digital human; and the voice data of the ergonomic digital human comprises an average decibel of the ergonomic digital human's voice and an average speech rate of the ergonomic digital human.

5. The method for calibrating an ergonomic digital human based on a digital standard human according to claim 1, wherein the calibration evaluation indicator of the ergonomic digital human with a digital human simulation system is analyzed as follows:

the morphological calibration indicator, the functional calibration indicator and the interaction calibration indicator of the ergonomic digital human are analyzed to obtain the calibration evaluation indicator of the ergonomic digital human with a digital human simulation system, with a specific analysis formula as follows:

$$\delta = e^{\frac{(\phi_1 * f_1 + \eta * f_2 + \tau * f_3)}{f_1 * f_2 * f_3}};$$

in the formula, $\delta$ is a calibration evaluation indicator of the ergonomic digital human with a digital human simulation system, e is a natural constant, $\phi_1$ is a morphological calibration indicator of the ergonomic digital human, $\eta$ is a functional calibration indicator of the ergonomic digital human, $\tau$ is an interaction calibration indicator of the ergonomic digital human, $f_1$ is a weight factor of the morphological calibration indicator of the ergonomic digital human preset in the digital standard human database, $f_2$ is a weight factor of the functional calibration indicator of the ergonomic digital human preset in the digital standard human database, and $f_3$ is a weight factor of the interaction calibration indicator of the ergonomic digital human preset in the digital standard human database.

6. The method for calibrating an ergonomic digital human based on a digital standard human according to claim 1, wherein the ergonomic calibration of the ergonomic digital human with the digital human simulation system is optimized as follows:

the calibration evaluation indicator of the ergonomic digital human with a digital human simulation system is compared with the preset calibration reference indicator of digital standard human to obtain a calibration accuracy value of the ergonomic digital human, and then matched with a calibration optimization strategy corresponding to each calibration accuracy value interval of the ergonomic digital human to obtain a calibration optimization strategy of the ergonomic digital human, so as to optimize the ergonomic calibration of the ergonomic digital human with the digital human simulation system.

\* \* \* \* \*